F. H. IHLENBURG.
PROTECTOR FOR PNEUMATIC TIRES.
APPLICATION FILED DEC. 21, 1914.
1,202,390.
Patented Oct. 24, 1916.
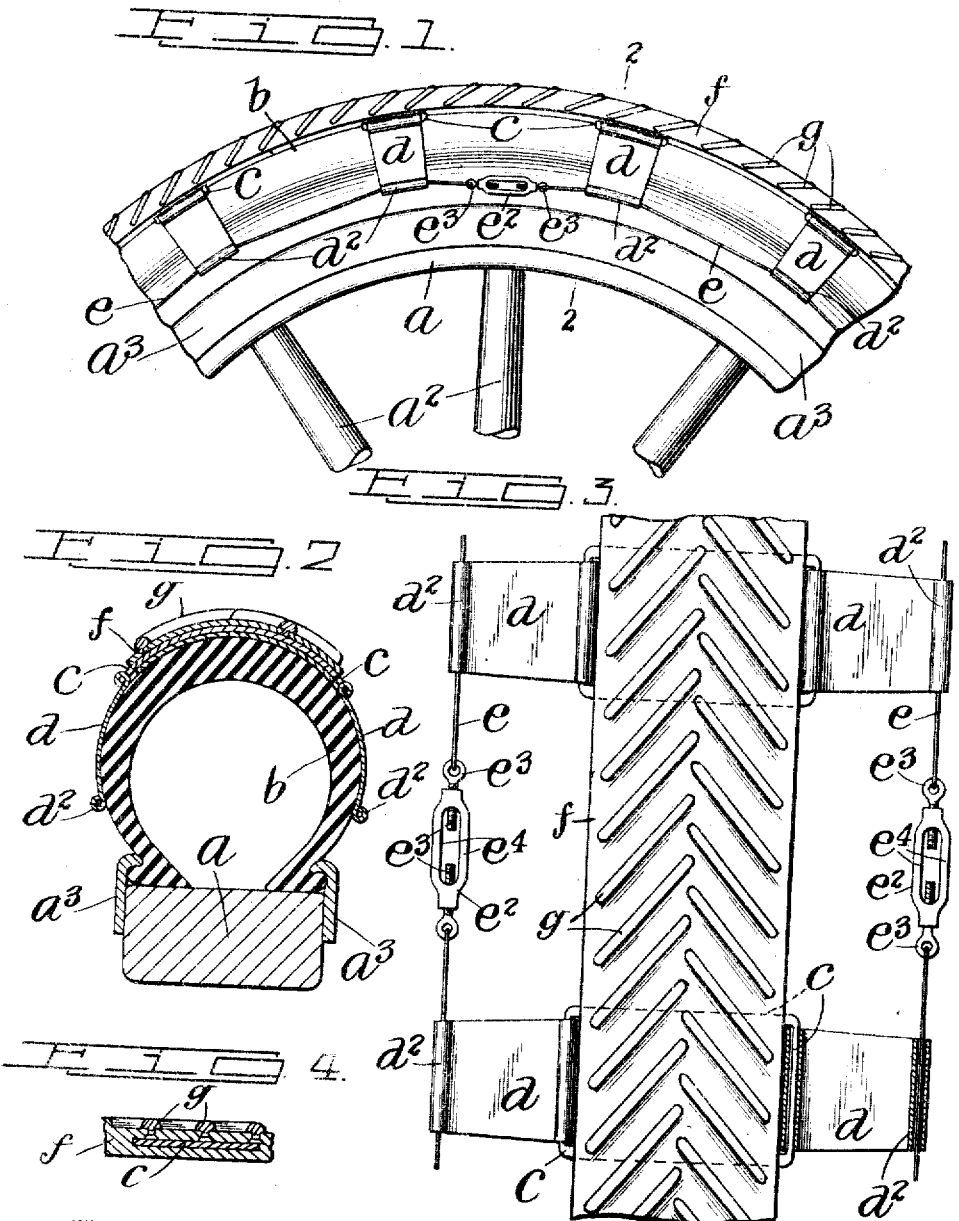
INVENTOR
Frederick H. Ihlenburg,
BY Edgar Tate
ATTORNEYS
WITNESSES:

UNITED STATES PATENT OFFICE.

FREDERICK H. IHLENBURG, OF NEW YORK, N. Y.

PROTECTOR FOR PNEUMATIC TIRES.

1,202,396.

Specification of Letters Patent.   Patented Oct. 24, 1916.

Application filed December 21, 1914.   Serial No. 878,396.

*To all whom it may concern:*

Be it known that I, FREDERICK H. IHLENBURG, a citizen of the United States, and residing in the city of New York, county and State of New York, have invented certain new and useful Improvements in Protectors for Pneumatic Tires, of which the following is a specification, such as will enable those skilled in the art to which it appertains to make and use the same.

The object of this invention is to provide a protector for pneumatic tires which will prevent puncture thereof and which will extend the life or use of a tire, and which will also serve to prevent skidding, and with this and other objects in view the invention consists in a device or devices of the class specified, constructed and operating as hereinafter described and claimed.

The invention is fully disclosed in the following specification, of which the accompanying drawing forms a part, in which the separate parts of my improvement are designated by suitable reference characters in each of the views, and in which:—

Figure 1 is a side view of a part of the rim portion of a wheel with a pneumatic tire mounted thereon and provided with my improvement; Fig. 2 a transverse or radial section on the line 2—2 of Fig. 1; Fig. 3 an outer plan or face view of a part of my improved tire protector, with part of the construction broken away; and Fig. 4 a section on the line 4—4 of Fig. 3.

In the drawing forming part of this specification, I have shown at $a$ the rim of a wheel with which the spokes $a^2$ are connected and at $b$ I have shown a pneumatic tire, or the shoe of a pneumatic tire, and said tire or shoe is secured to the rim $a$ in the construction shown by annular side plates $a^3$ in the usual manner, but my invention is not limited in any way to the rim $a$, or its construction, nor to the means for securing the tire or shoe to said rim.

In the practice of my invention, I provide a protector of the class specified comprising plate members $c$, and any desired number of which may be employed, and which are placed transversely of the outer or bearing surface of the tire, and with the outer end portions of which are connected link members $d$ preferably in the form of metal plates, and the link members $d$ are loosely connected with the plates $c$ and the outer end portions of the parts $d$ are folded to form keepers $d^2$ through which are passed flexible rods $e$, the ends of which are connected by turn-buckle devices $e^2$, consisting of eye-bolts $e^3$ with which the ends of the rods $e$ are connected and link members $e^4$, and the eye-bolts $e^3$ are threaded and passed inwardly through the ends of the link members $e^4$ which are similarly threaded.

Passed entirely around the tire and connected with the plates $c$ is a heavy flexible band $f$ of suitable material, and in the construction shown the plates $c$ are passed transversely through said band and said band is provided with rivets $g$ which are passed therethrough and the outer ends of which are provided with knob-shaped heads $g^2$ which are preferably oblong in form and which operate as anti-skidding devices, or to prevent the skidding of a wheel provided with my improved tire protector.

With the foregoing construction there is one of the rods $e$ at each side of the wheel, and these rods form circles extending entirely around the tire, and the diameters of which are less than the outer diameter of the tire, and by means of the turn-buckles $e^2$ these rods may be tightened so as to secure the protector to the tire and prevent its movement thereon. It will also be seen that the length of the parts $c$ and $d$ is such that they extend more than half around the tire, and this also aids the rods $e$ to securely bind the protector of which they form a part to the tire.

The band $f$ when constructed and applied in the manner shown and described forms the actual tread surface of the tire, and said tire is thus protected against puncture or other injury, and the life of the tire in use will thus be indefinitely extended and a new protector may be substituted for an old one whenever desired, or a new band member $f$ may be secured to, or on the plates $c$.

My invention is not limited to the form and construction of the band member $f$ herein shown and described, nor to any particular means for securing the same to the plates $c$, and various changes in and modifications of the details of the construction of my improved tire protector, as herein shown and described may be made, within the scope of the appended claim, without departing from the spirit of my invention or sacrificing its advantages.

Having fully described my invention, what I claim as new and desire to secure by Letters Patent, is:—

The herein described protector for pneumatic tires comprising a band flexible in all directions, extending entirely around the bearing surface of the tire, anti-skidding devices provided on said tread, a plurality of plates extending transversely through said band and provided with slotted extremities, link members passing through said slots and connected to the ends of said plates, loops provided at the outer ends of said link members, tie rods passing through the loops and adjustable means securing the ends of said tie rods.

Signed at 118 East Eighty-ninth street New York city, in the county of New York and State of New York, this 18th day of Dec., A. D. 1914.

FRED'K H. IHLENBURG.

Witnesses:
WILLIAM J. KAUTZNER,
WILLIAM WILLIAMS.